Dec. 23, 1941.                J. A. PITSCH                2,267,252
                             HOSE COUPLING
                          Filed Nov. 19, 1940
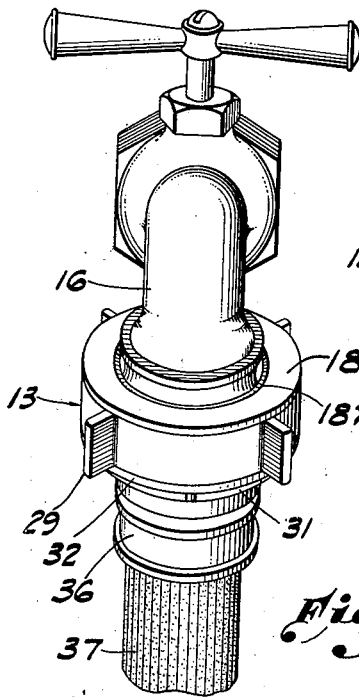
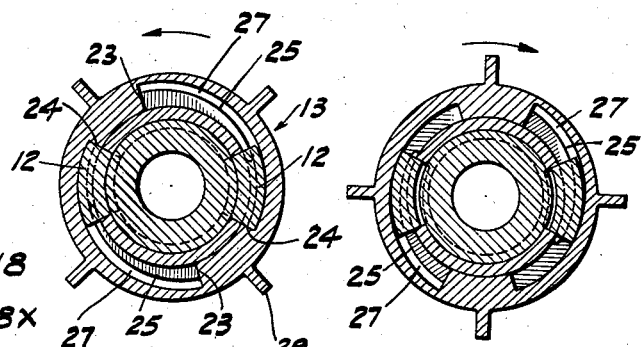
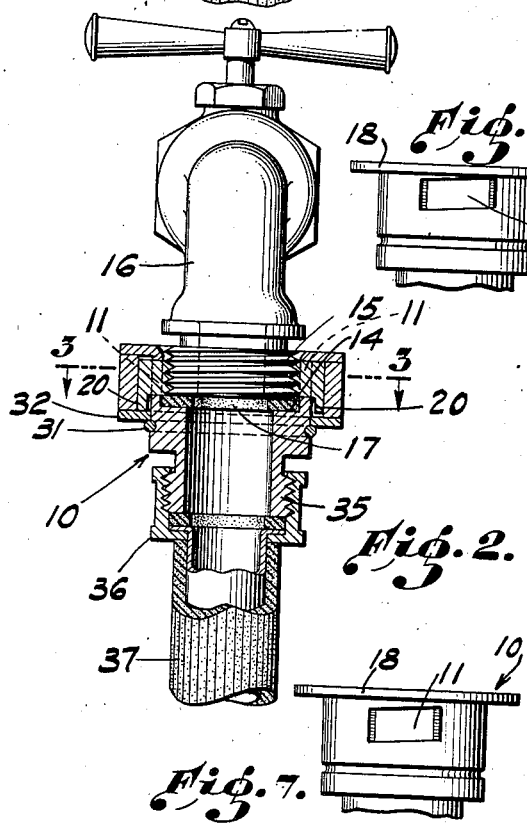
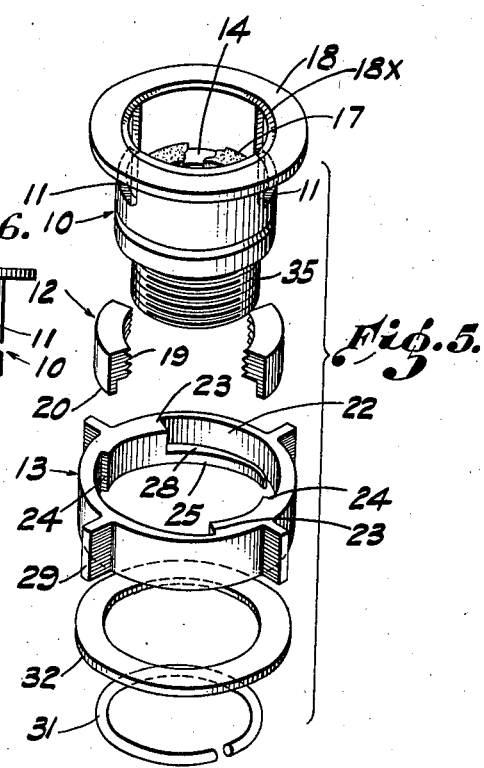
JULIUS A. PITSCH,
INVENTOR.
BY
ATTORNEY.

Patented Dec. 23, 1941

2,267,252

UNITED STATES PATENT OFFICE 2,267,252

HOSE COUPLING

Julius A. Pitsch, Hollywood, Calif., assignor of one-half to Ellis C. Harlin, Los Angeles, Calif.

Application November 19, 1940, Serial No. 366,268

4 Claims. (Cl. 285—150)

This invention relates to a hose coupling.

Speaking more specifically, the invention pertains to an improved construction of dogs for gripping the portion of the conduit to which the coupling is applied, and to superior means for actuating said dogs.

Among the objects of the invention are: to provide an improved housing and mounting means for the dogs or gripping devices of a hose coupling of the kind to which the invention pertains; and to provide a quicker and more efficient operating means for the gripping or clamping portions of the device.

Still another object of the invention is to provide an improved type of screw-threaded gripping dogs which will not only grip the coupling against a gasket in a liquid tight manner but will at the same time afford a superior friction tight retaining means for the coupler.

Yet still another object of the invention is to provide a coupling device wherein gripping dogs having internally screw threads are rotationally advanced toward the gripping position in such a manner as to insure that their threads will be more positively and accurately mated with the threads of the part to which the coupling is applied.

Other objects, advantages and features of invention will hereinafter appear.

Referring to the accompanying drawing, which illustrates what is at present deemed to be a preferred embodiment of the invention.

Fig. 1 is a perspective view of the coupling device showing the same attached to a faucet.

Fig. 2 is a view of the device resembling Fig. 1 except that the faucet is shown in front elevation and the upper portion of the coupling device is shown in vertical mid-section.

Fig. 3 is a transverse section, the plane of section being inindicated by the line 3—3 of Fig. 2.

Fig. 4, like Fig. 3, is a transverse section taken on the plane indicated by the line 3—3 on Fig. 2, but showing the gripping dogs in a partially released position.

Fig. 5 is a perspective view wherein the various parts of the device are shown disassembled, but are juxtaposed to each other in a manner which indicates their relative positions when assembled.

Figs. 6 and 7 are side elevations of the body part of the coupling illustrating the apertured portions thereof, the lower portion of the coupling being broken away to contract the view.

Referring in detail to the drawing, the main parts of the device are the inner annular body 10 having the diametrically opposite, vertically spaced, dog-receiving apertures 11, the pair of dogs 12, parts of which project into or through said apertures at all times, and the cam sleeve 13 for operating said dogs in a radially inward and outward direction, said sleeve being manually turnable and forming a means for not only operating the dogs, but which also forms the outer portion of a housing structure which contains them.

The intermediate portion of said annular body 10 is furnished with an internal annular shoulder forming flange 14 which, when the device is in its applied condition, abuts against the externally threaded discharge portion 15 of the faucet 16, except for the intervening gasket 17. The upper portion of said body 10 is furnished with an outwardly directed annular flange 18, said flange having an internal bevel 18x to afford clearance for the application of certain types of faucets. Said dogs 12, by preference and as shown, are identical in construction, each of them being segmentally shaped and having internal screw threads 19 and a basal flange 20 which is curved to correspond with the segmental shape of the dog, the outer face of said flange being flush with the outer surface of the body portion of the dog. The threads 19 are of the proper pitch and size to cooperate with the threaded portion 15 of the faucet 16.

The upper and lower edges of said apertures 11 are shown parallel and are inclined as shown in Figs. 6 and 7 in order to support the threads of the dogs at the same inclination as the threads of the faucet, so that, when the dogs are advanced radially and finally rotationally, their threads will mate properly, as to pitch and position, with the threads of the faucet.

The screw threaded body portion of each dog 12 at all times projects into or through the apertures 11 of the tubular member 10 with which the dog is associated with a slight vertical and horizontal working clearance, thereby maintaining the threaded portion of the dogs in a proper position to coact with the threaded part 15 of the faucet. The basal flange 20 of each dog is of substantially uniform thickness from end to end. At diametrically opposite sides the sleeve 13 has an extensive cam face 22 which defines the outer boundary of a space which decreases in its radial extent from a shoulder 23 to a shoulder 24, said shoulders being formed upon said sleeve at opposite ends of said space. The sleeve 13 is also furnished with an internal arcuate segmental cam tongue 25, said tongue projecting from the lower portion of the shoulder 23, the tip of said tongue being spaced away from the shoulder 24 a distance somewhat less than the length of each dog 12.

Each tongue 25, as well shown in Fig. 3, has its convex side directed outwardly and is spaced away from the inner wall of the sleeve 13 a sufficient distance to provide a segmental clearance or cam slot 27, the width of said slot being slightly greater than each dog flange 20. Each of the tongues 25 is also tapered with respect to its horizontal thickness but its vertical dimension may be equal throughout its length. The upper surface 28 of each tongue 25, whether inclined or level, must at no time extend above the level of any portion of the lower edges of the apertures 11, so as not to interfere with the radially outward and inward movements of the dogs.

The sleeve 13 is shown furnished with external radial ears 29 in order to facilitate manually gripping the sleeve to turn it in one direction to apply the dogs or in the reverse direction to release them.

The annular body 10 is furnished with a circumferential external groove within which seats a spring wire ring 31 which, in turn, supports a washer 32 that underlies the sleeve 13.

The lower portion of the body 10 has an externally screw threaded extension 35 upon which may be screwed the coupling 36 of a hose 37.

The internal diameter of the clamping sleeve 13 is slightly greater than the external diameter of the annular body 10, hence said sleeve, viewing the parts as shown in Fig. 2 and 5, may be moved upwardly around the body portion of the member 10 and thereby be brought into engagement with the lower surface of the flange 18. Thereupon the retaining ring or washer 32 is slipped upwardly to a position slightly above the groove for the spring wire clamp 31, whereupon said clamp may be sprung into said groove, thus retaining the assembled parts in their operative positions.

In applying the coupling to the faucet 16, after the gasket 14 has been put in place within the coupling, the upper or mouth portion of the coupling body 10 is moved upwardly into a surrounding relation to the lower end of the faucet, such upward movement being continued until the gasket 17 is brought into engagement with the faucet. Then the cam sleeve 13 is rotated in the direction indicated by the arrow in Fig. 3, thereby (assuming the dogs initially to be in the position opposite to that of Fig. 3) causing the cam faces 22 to force dogs to move radially inward, preparatory to the shoulders 23 imparting to the assembled coupling a final rotational movement which screws the coupling up to its fully attached position.

In performing the aforesaid rotational movement of the cam sleeve; the first effect upon the dogs is to cause their forward ends (from the viewpoint of this movement) to first mate with the teeth of the faucet, then as the sleeve is given the final portion of its movement, the threads of the dogs are caused, throughout their whole length, to move up snugly against the threads of the faucet or other conduit connection so that a final turn of the coupling will fully apply it.

The convex surfaces of the cam tongues act upon the flanges of the dogs to move the dogs radially outward when the coupling is rotated in a direction to detach it.

It should be understood that the present disclosure is for the purpose of illustration only and that this invention includes all modifications and equivalents which fall within the scope of the subject matter claimed.

What is claimed is:

1. In a hose coupling, an annular member having a body furnished with an annular flange projecting internally from its inner periphery, said member when positioned for attaching to a downwardly directed faucet, having diametrically opposite apertures through it above said flange, a manually turnable cam sleeve mounted upon and extending around the apertured portion of said annular member with a working fit in relation thereto, a plurality of dogs having body portions loosely occupying said apertures, said dogs having inwardly directed screw-threaded gripping faces, the lower portions of said dogs having depending flanges with smooth outer faces which are continuous with the outer faces of the portions of said dogs above them, said flanges also having smooth inner faces, the aforesaid cam sleeve having smooth cam surfaces to act externally upon the outer faces of said dogs to move them radially inward to a gripping position when said sleeve is turned in one direction, and having also smooth cam faces engaging the internal faces of said flanges of said dogs to move the dogs outwardly to a released position when said sleeve is turned through a partial rotation in the opposite direction.

2. The subject matter of claim 1 and, said apertures which contain said dogs having inclined upper and lower edges positioned to maintain the threaded portions of the dogs properly inclined to match the pitch of the threads of the part to which they are applied.

3. The subject matter of claim 1 and, said cam elements consisting of arcuate tongues formed within said sleeve in a fixed relation thereto, there being segmental clearances along the outer sides of said tongues affording guides for the flanges of said dogs.

4. In a hose coupling, an annular member having an annular flange projecting inwardly from its inner periphery, said member having diametrically opposite apertures through it above said flange, a manually turnable cam sleeve mounted upon and extending around the apertured portion of said annular member, a plurality of dogs having body portions which occupy said apertures, said dogs having inwardly directed gripping faces, said dogs having arcuate downwardly extending flanges, and said annular member having arcuate segmental cam slots to receive said flanges and act upon them when said member is reversely turned, thereby moving said dogs radially outward and inward.

JULIUS A. PITSCH.